United States Patent Office

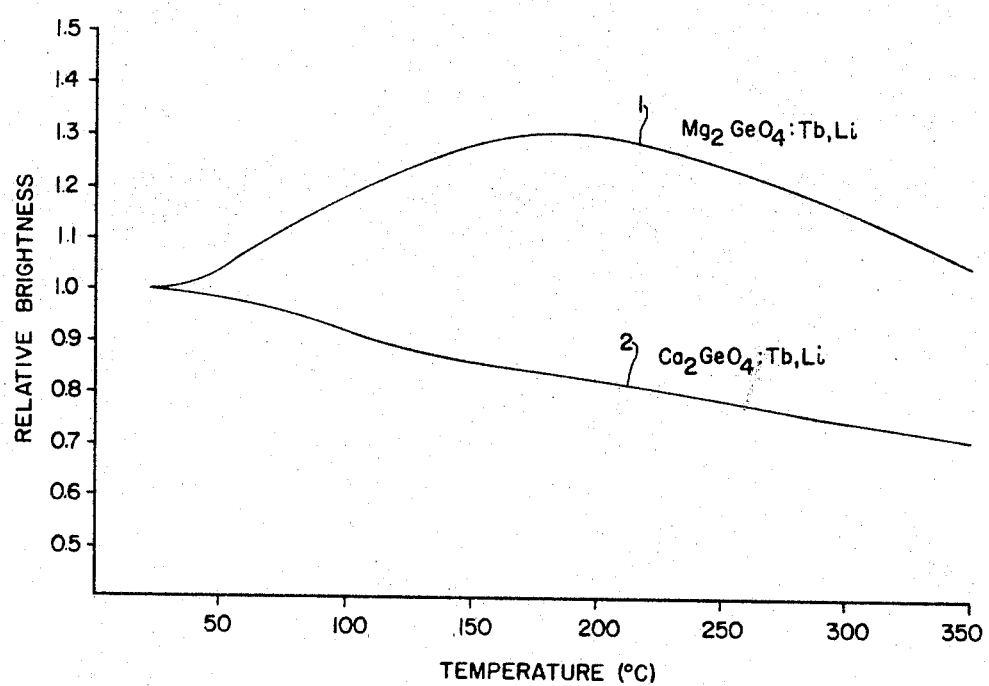

3,451,941
Patented June 24, 1969

3,451,941
TERBIUM ACTIVATED CALCIUM AND MAGNESIUM GERMANATE PHOSPHORS
William A. McAllister, Morristown, N.J., assignor to Westinghouse Electric Corporation, Pittsburgh, Pa., a corporation of Pennsylvania
Filed Nov. 17, 1965, Ser. No. 508,220
The portion of the term of the patent subsequent to July 12, 1983, has been disclaimed
Int. Cl. C09k 1/04
U.S. Cl. 252—301.4
10 Claims

ABSTRACT OF THE DISCLOSURE

Luminescent composition consisting of calcium and/or magnesium orthogermanate activated by terbium plus lithium, or by terbium plus lithium plus manganese. The gram-atom ratio of various activator constituents to germanium are specified. The composition displays good temperature dependence characteristics.

---

This invention relates to phosphor material and, more particularly, to phosphor material which has good temperature-dependence characteristics and a fluorescence which can be varied in color by varying the activators and activator concentrations.

Most photoluminescent phosphor materials fluoresce efficiently at room temperature to convert ultraviolet radiations into visible radiations. At relatively high temperatures, however, their fluorescent efficiency drops off rapidly. A few phosphors operate efficiently at relatively high temperatures and are used extensively in high-pressure, mercury-vapor lamps. Such phosphors are known as having "good temperature-dependence characteristics." One class of such phosphors is described in U.S. Patent No. 2,748,303, dated May 29, 1956, to Thorington. Another class of such phosphors is described in U.S. Patent No. 3,025,423, dated Mar. 13, 1962, to Rimbach. It is desirable to provide other phosphors which will efficiently convert ultraviolet radiations to visible radiations. It is also desirable to provide phosphor material which has good temperature-dependence characteristics.

It is therefore an object of this invention to provide novel phosphor material which efficiently converts ultraviolet radiations into visible radiations of variable colors.

It is another object to provide novel phosphor material which has good temperature-dependence characteristics.

Briefly these and other objects, which will become apparent as the description proceeds, are achieved by providing a germanate phosphor comprising a magnesium germanate, calcium germanate, or calcium-magnesium germanate activated by terbium plus lithium. The addition of manganese provides improved color rendition by adding emission of longer wavelengths.

For a better understanding of the invention reference may be had to the sole figure of the accompanying drawing which shows curves of temperature versus brightness for activated magnesium- and calcium-germanate phosphor of the present invention.

The phosphor of the present invention has a preferred matrix or host crystal of magnesium orthogermanate ($Mg_2GeO_4$). Other matrices may be employed such as calcium orthogermanate ($Ca_2GeO_4$), or calcium-magnesium germanate [$(Ca—Mg)_2GeO_4$]. These host crystals are activated by terbium plus lithium, or terbium plus lithium plus manganese. The phosphor can be described as a germanate phosphor having the general formulation $$X_2GeO_4:Z$$

In this formula X is at least one matrix constituent material of the group consisting of calcium and magnesium, and Z is material of the group consisting or terbium plus lithium, or terbium plus lithium plus manganese.

As a specific example for preparing the present phosphor having a green emission, two moles of magnesium carbonate ($MgCO_3$) are thoroughly mixed with one mole of germanium dioxide ($GeO_2$), 0.0312 mole terbium oxide ($Tb_4O_7$) and 0.0625 mole lithium carbonate ($Li_2CO_3$). All of the constituents of this raw mix are white with the exception of terbium oxide which is brown. The uniform brown color of the resulting mixture is a rough indication of the thoroughness of the mixing. After mixing, the foregoing constituents are preferably fired in an inert atmosphere such as a nitrogen, or in a nitrogen atmosphere which contains approximately two percent hydrogen, but no more than ten percent by volume of hydrogen. Too much hydrogen will cause excessive reduction during firing. An air firing atmosphere may be employed if desired, but the output is diminished thereby. The preferred firing temperature is between 1200° C. and 1400° C., 1325° C. being optimum. The firing is preferably continued for several hours. The fired material is then crushed to finely divided status. The most efficient phosphor was produced after two hours at 1325° C. with removal and grinding after one hour.

In the absence of lithium the phosphor has quite poor emission characteristics. Addition of even small concentrations (.002 gram-atom per gram-mole of matrix) increases brightness markedly. Best output ensues when terbium and lithium are present in equal gram-atom concentrations. Since no magnesium is omitted from the formulation, the role of lithium as an agent responsible for inclusion of terbium in the lattice is substantiated.

The phosphors of the present invention which are activated solely by terbium plus lithium display a green line emission with an excellent brightness.

The present phosphor can be modified by adding manganese, such as 0.03 mole of manganese carbonate ($MnCO_3$), to the raw mix described in the foregoing specific example. The resulting phosphor has a continuous band of emission in the orange to orange-pink region of the visible spectrum depending upon the relative amount of manganese addition. This emission is added to the line emission characteristics of terbium, the latter now being somewhat diminished in intensity as the result of including the manganese.

All of the phosphor embodiments of the present invention have good output at room temperature and at elevated temperatures, as shown in the sole figure of the drawing. In this figure, "Curve 1" shows the "Brightness vs. Temperature" curve for the terbium- and lithium-activated magnesium orthogermanate phosphor embodiment and "Curve 2" shows a similar curve for similarly activated calcium orthogermanate phosphor.

The phosphors of the present invention are responsive to excitation by shortwave ultraviolet (254 nm.) as well as longwave ultraviolet (365 nm.). The phosphor excitation used in taking the curves shown in the drawing corresponded to the ultraviolet radiations emitted by a high-pressure, mercury-vapor lamp.

Terbium is commercially available as $Tb_4O_7$. Other forms of terbium may be used such as terbium nitrate ($Tb(NO_3)_3$) and terbium acetate ($Tb(C_2H_3O_2)_3$). The preferred gram-atom ratio of the element terbium to germanium in the phosphor is 0.125:1. However, a gram-atom range of terbium to garmanium of from .004:1 to 0.4:1 can be used. The preferred gram-atom ratio of the lithium to germanium in the phosphor is 0.125:1. The gram-atom ratio of lithium to germanium may be varied from .002:1 to 0.2:1. The preferred gram-atom ratio of manganese to germanium is 0.03:1. The gram-atom ratio of manganese to germanium may vary from 0.005:1 to .05:1. If the activator ranges are allowed to vary outside of these specified ranges, the brightness of the resulting phosphor decreases.

Summarizing, phosphors are obtained over the following range of activator concentrations:

$$0.004 \leq Tb/Ge \leq 0.4$$

with best results when Tb/Ge=0.125

$$0.002 \leq Li/Ge \leq 0.2$$

with best results when Li/Ge=0.125

$$.0005 \leq Mn/Ge \leq 0.05$$

with best results when Mn/Ge=0.03

In preparing the calcium germanate modification of the phosphor, an equivalent molar amount of calcium carbonate is substituted for the magnesium carbonate as specified in the foregoing example. In addition, calcium carbonate and magnesium carbonate can be mixed in any proportion when preparing the phosphor, maintaining the molar ratio of carbonate to germanium dioxide at 2:1.

Progressive addition of calcium, while not affecting room temperature output, somewhat affects the temperature dependence of the phosphor. This is evident in the drawing, Curve 1 being the temperature dependent of a good $Mg_2GeO_4$:Tb,Li phosphor, and Curve 2 that of the corresponding calcium material.

When coating the phosphor onto lamp bulbs, it is desirable to limit the lehring temperatures which are normally required to volatize organic binder materials. The phosphor of the present invention can readily be coated onto a lamp bulb by means of a conventional electrostatic coating process, thereby precluding the necessity of using an organic binder material. With such a coating process, the maximum temperature to which the phosphor is exposed during lamp fabrication need not exceed about 450° C.

It will be recognized that the objects of the invention have been achieved by providing novel phosphor material which can be modified to vary the emission colors. In addition, the phosphor material has good temperature-dependence characteristics which makes it particularly adapted for use with high-pressure, mercury-vapor lamps.

I claim as my invention:

1. An orthogermanate phosphor having the general formulation $X_2GeO_4$:Z, wherein X is at least one material of the group consisting of magnesium and calcium, and Z consists essentially of activator material in activating proportions of the group consisting of terbium plus lithium and terbium plus lithium plus manganese.

2. The phosphor as specified in claim 1, wherein said activator consists of terbium plus lithium, the gram-atom ratio of terbium to germanium is about 0.004:1 to about 0.4:1, and the gram-atom ratio of lithium to germanium is from about 0.002:1 to about 0.2:1.

3. The phosphor as specified in claim 2, wherein said activator includes manganese in gram-atom ratio with the germanium of from about 0.005:1 to about 0.05:1.

4. The phosphor as specified in claim 2, wherein said activator consists of terbium plus lithium, the gram-atom of terbium to germanium is about 0.125:1, and the gram-atom ratio of lithium to germanium is about 0.125:1.

5. The phosphor as specified in claim 4, wherein said activator includes manganese in gram-atom ratio with the germanium of about 0.03:1.

6. Magnesium orthogermanate phosphor having the general formula $Mg_2GeO_4$:Z, wherein Z is one material of the group consisting of terbium plus lithium and terbium plus lithium plus manganese.

7. The phosphor as specified in claim 6, wherein said activator consists of terbium plus lithium, the gram-atom ratio of terbium to germanium is from about 0.004:1 to about 0.4:1, and the gram-atom ratio of lithium to germanium is from about 0.002:1 to about 0.2:1.

8. The phosphor as specified in claim 7, wherein said activator includes manganese in gram-atom ratio with the germanium of from about 0.005:1 to about 0.5:1.

9. The phosphor as specified in claim 7, wherein said activator consists of terbium plus lithium, the gram-atom ratio of terbium to germanium is about 0.125:1 and the gram-atom ratio of lithium to germanium is about 0.125:1.

10. The phosphor as specified in claim 9, wherein said activator includes manganese in gram-atom ratio with the germanium of about 0.03:1.

References Cited

UNITED STATES PATENTS

| | | |
|---|---|---|
| 2,457,054 | 12/1948 | Leverenz. |
| 3,260,675 | 7/1966 | McAllister. |

OTHER REFERENCES

Kroger: Some Aspects of the Luminescence of Solids, 1948, pp. 268, 272, 277, 282, 295, 296. Copy in Scientific Library.

TOBIAS E. LEVOW, *Primary Examiner.*

R. D. EDMONDS, *Assistant Examiner.*